United States Patent Office 2,763,741
Patented Sept. 18, 1956

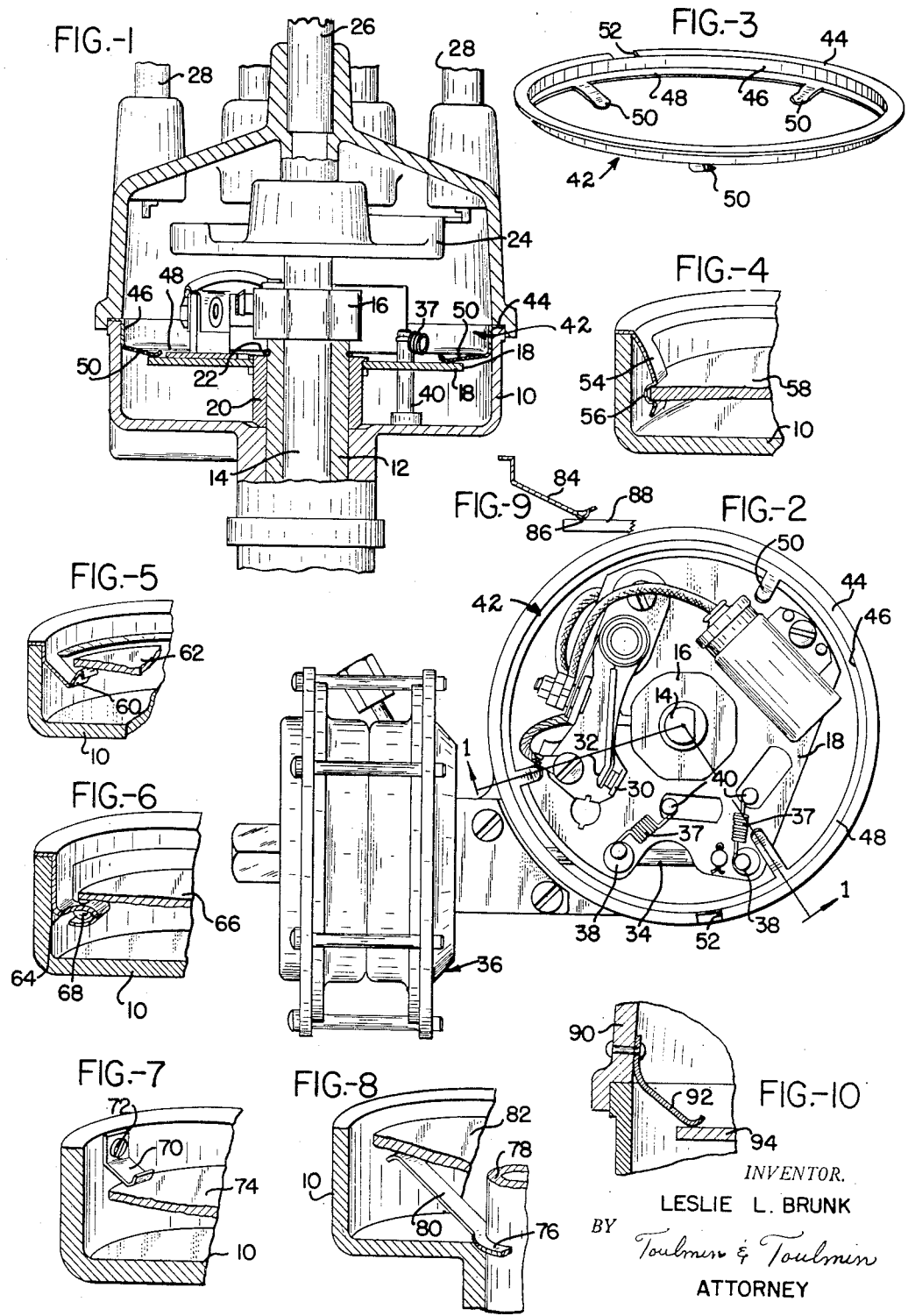

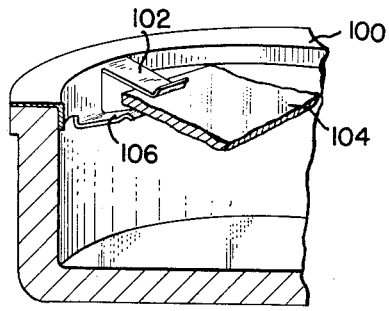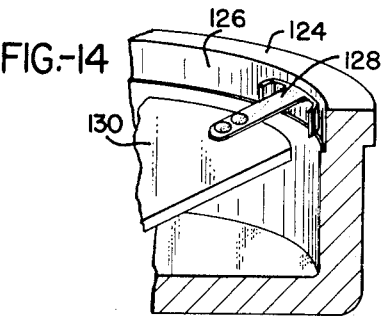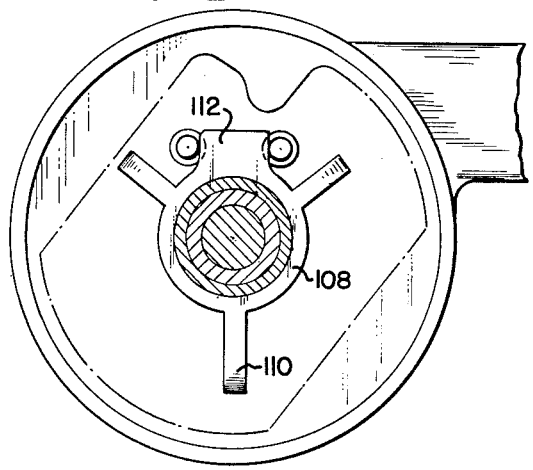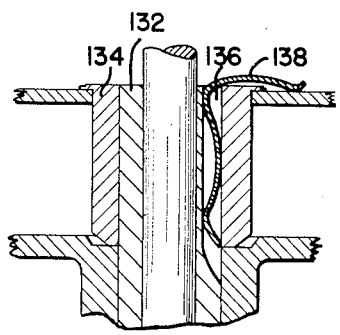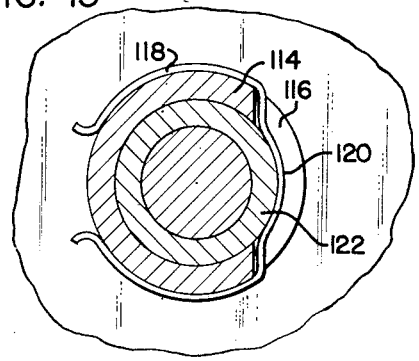

2,763,741

DEVICE FOR STABILIZING A DISTRIBUTOR PLATE

Leslie L. Brunk, Detroit, Mich.

Application August 24, 1954, Serial No. 451,783

5 Claims. (Cl. 200—31)

This invention relates to automotive ignition systems, and is particularly concerned with an arrangement for use in connection with a distributor plate in an automotive ignition system.

More particularly still, this invention relates to a method of and arrangements for stabilizing the distributor plate in the ignition system for an engine so that the distributor plate does not wobble or flutter on the axis of the distributor cam, whereby the conditions of operation for which the distributor is designed and the distributor plate is adjusted will be closely maintained at all times.

Ignition distributors for internal combustion engines are generally so arranged that either one or both of the cam and the distributor plate are movable in response to changing conditions of operation of the engine which the ignition system supplies. For example, as the engine speeds up it is possible to advance the instant of ignition, and this may be accomplished by a centrifugal advance mechanism associated with the ignition cam, or a vacuum responsive arrangement may be employed for advancing the distributor plate in response to increasing vacuum in the intake manifold.

Similarly, when an engine is placed under load, and it is desired to retard the spark, this is accomplished by utilizing the drop in vacuum at some point along the intake manifold system to permit spring means associated with the distributor plate to retract the plate from its advanced position.

Since all of these arrangements require a distributor plate to be movably mounted within a distributor housing it follows that there will be some initial looseness in connection with the support of the plate and the probability that continued use of the ignition distributor will bring about wear of the support for the plate and even a greater degree of looseness thereof. This looseness in the support of the plate will permit the plate to wobble and flutter, with the result that there will be at least slight changes in the cam angle that will detract from the efficiency of operation of the engine.

Another factor contributing to inefficient operation of an engine having an ignition distributor with a movable plate is the tendency, at least occasionally, for the plate to flutter in a circumferential direction as it is moved to and fro by changes in vacuum in the vacuum operator connected thereto.

Having the foregoing in mind, it is a primary object of the present invention to provide a means for overcoming the drawbacks referred to above in connection with movably supported distributor plates for engine ignition systems.

A further object of the present invention is the provision of a device that can be employed in a conventional distributor without any change thereof in order to hold the distributor plate stable under all conditions of operation.

Another object of the present invention is the provision of a simple device for use in connection with conventional ignition housings having movable plates therein which will stabilize the distributor plate and tend to prevent wear of the supporting parts thereof, thus retaining the original accuracy of the assembly and, if wear has already taken place in the assembly, compensating therefor to restore the assembly to its original operating efficiency.

These and other objects and advantages of the present invention will become more apparent upon reference to the following specification, taken in connection with the accompanying drawings, in which:

Figure 1 is a vertical sectional view of a conventional distributor housing having associated therewith a device according to the present invention, with the view being indicated with the line 1—1 on Figure 2;

Figure 2 is a plan view looking down on top of the distributor housing of Figure 1, but with the cover and rotor removed therefrom;

Figure 3 is a perspective view showing the preferred form which this invention can take;

Figures 4 through 9 show modified arrangements of the invention;

Figure 10 shows a form of the invention where the device of the present invention is carried by the distributor head or cap;

Figure 11 is a fragmentary perspective view showing an arrangement wherein the distributor plate is engaged on both the top and bottom surfaces thereof;

Figure 12 is a plan sectional view looking down into the housing and showing a preferred arrangement of a spider element for engaging the underneath side of the plate somewhat along the lines disclosed in Figure 8;

Figure 13 is a view showing how the distributor plate support hub could be slotted so that a spring clip could be mounted about the hub to engage the bushing and the distributor housing through the slot;

Figure 14 shows a modification wherein the resilient finger means is carried by the distributor plate; and Figure 15 shows an arrangement wherein one or the other of the bushing or the hub of the distributor plate is slotted to receive a longitudinally extending spring clip.

Referring to the drawings somewhat more in detail, Figure 1 shows a distributor housing 10 of the type having therein a central bushing member 12 that rotatably supports a cam shaft 14 that carries adjacent its upper end the cam 16 for operating the breaker points of the ignition system.

Bushing 12 is also availed of for supporting the movable breaker plate 18 which carries the breaker points referred to, and which breaker plate comprises a hub portion 20 fitting closely about bushing 12 and being retained in position thereon by a snap ring 22.

At its extreme upper end shaft 14 carries, in a conventional manner, a rotor 24 which distributes the high tension electrical energy delivered from the spark coil via cable 26 to the various cables 28 leading to the spark plugs of the engine.

In Figure 2 the arrangement of the breaker points will be seen wherein it will be noted that the breaker points consist of a stationary breaker point 30 and a movable breaker point 32 mounted on an arm having a block bearing on the periphery of cam 16.

Connected with distributor plate 18, at a suitable point on the periphery thereof, is a rod 34 leading in to a vacuum arrangement, generally indicated at 36, which is fixed to the distributor and which contains one or more diaphragms that are subjected to vacuums which exist in the intake manifold system of the engine for the purpose of advancing the distributor plate when this is desirable for increasing the efficiency of operation of the engine.

The springs 37, connected between adjustable posts 38 on the distributor plate and the stationary posts 40 extending upwardly from the bottom wall of the distributor housing, bias the distributor plate in a direction opposite to which it is moved by the vacuum device 36.

According to the present invention means are provided for frictionally and resiliently engaging the distributor plate 18 in such a manner to hold it against tilting movements relative to the axis of cam shaft 14, and also to prevent fluttering and erratic moving thereof thereby to maintain constant conditions of opening and closing the breaker points. This is extremely important for efficient operation of the engine, particularly so in connection with 8 cylinder engines, on account of the small size of the flats on the cam 16.

The device according to this invention, in its preferred form, is a ring 42, as shown in perspective in Figure 3, which consists of a horizontal flange portion 44 adapted to fit against the upper edge of distributor housing beneath the distributor head. The ring also comprises a downwardly extending flange portion 46 fitting inside the distributor housing, and which portion may be formed somewhat inwardly as at 48 adjacent the bottom for stiffening purposes.

Projecting inwardly and downwardly from spaced points about portion 48 are the spring fingers 50 which, as will be seen in Figures 1 and 2, bear on the marginal portion of plate 18. These spring fingers offer some frictional resistance to movement of the plate, but this resistance is sufficiently small that it does not interfere with the movement of the plate by the vacuum device 36 and springs 37. Frictional resistance to movement of the plate is, however, sufficient to prevent erratic fluttering movement thereof which might otherwise occur in indeterminate positions of the plate where the thrust of the vacuum device is exactly counterbalanced by the tension of the springs 37.

A more important function of the fingers 50 is to press down on the plate at spaced points thereabout so that the plate is maintained in a predetermined fixed position transverse to the axis of cam shaft 14, whereby the plate cannot tilt relative to the said axis and change the conditions under which the breaker points are opened and closed; the arrangement thus stabilizing the entire operation of the movable distributor plate and promoting efficient operation of the engine.

The device can be placed in a conventional distributor without change thereof, and is adapted for being locked in position by notch means 52 provided therein which will register with a corresponding notch means in the distributor housing for receiving a lug key formed on the distributor head.

The device, when placed in a new distributor, will prevent wobble and tilting of the plate therein, and thus prevent localized wear on the support for the plate thereby promoting long life of the distributor assembly and accurate operating conditions.

When the device is employed with an old distributor, which may have a somewhat worn support for the movable plate, the device prevents tilting and wobbling of the plate, thus restoring the old distributor assembly to substantially the same efficient operating conditions obtained when new.

It will be evident that the method of the present invention can be practiced in various manners and by devices other than the one illustrated in Figures 1 through 3. For example, as is shown in Figure 4, the device, where the shape of the distributor plates permits, may effect engagement with the distributor plate at the very edge thereof as by means of the spring finger means 54 which is formed so as to have a generally V-shaped groove 56 therein to receive the edge of distributor plate 58. The device will, at one time, hold the plate against tilting and wobbling movements and within the distributor housing, will prevent lateral movement thereof, and will also provide a certain degree of frictional drag on the plate.

Figure 5 illustrates how a device, according to this invention, could be provided with spring finger means 60 engaging the underneath side of a distributor plate 62 for the purpose of stabilizing the plate according to the teachings of the present invention.

In Figure 6 a finger means 64 is provided that projects beneath the periphery of the distributor plate 66, and which finger means carries the ball 68 bearing against the distributor plate to stabilize it in the manner previously described.

The resilient pressure on the plate can also be accomplished by individual spring finger means as indicated at 70 in Figure 7, wherein the individual spring finger means are each retained in position on the distributor housing by the screws 72 that can be placed into small holes drilled and tapped in the housing. The plate 74, in Figure 7, will be stabilized in the same manner as described previously.

A still further arrangement that can be availed of would utilize a spider arrangement 76 as in Figure 8 mounted about the central bushing 78 of the distributor housing and having arms 80 extending upwardly and outwardly to engage the underneath surface of the distributor plate 82. The use of the arrangement of Figure 8 could be accomplished simply by removing the distributor plate and dropping the spider in place about the central bushing although best results would be obtained by locating the spider in position in the housing from suitable means, such as by a portion engaging one or the other and extending to between the stationary spring posts 40.

The modification of Figure 9 shows how a spring finger 84, according to this invention, could be provided with a dimple 86 on the finger in order to reduce the area of contact of the spring finger on the plate 88.

In any case, whether the method of the present invention is practiced by the use of a continuous ring having a plurality of spring fingers engaging the distributor plate either on the top or the bottom thereof, or whether it is practiced by the use of individual spring fingers individually secured within the distributor housing, it will be apparent that a distributor plate is constrained to remain in a single fixed plane thereby stabilizing the operation of the system.

The various forms which the device, according to this invention, take insofar as the drawings are concerned are all of a nature to be associated directly with a distributor housing, but it will be evident that it is conceivable that the device could also be arranged to fit within the distributor head, either as a ring having a portion engaging the inside of the head, or as individual finger means fixed to the head and engaging the plate, and the same operating conditions would obtain after the head was placed in position on the distributor housing and secured thereto.

An arrangement of this nature is shown in Figure 10 wherein the distributor head or cap 90 carries the resilient finger means 92 that will engage the plate 94 in the described manner when the head is placed on the body of the distributor housing.

In Figure 11 there is provided a ring member 100 having resilient spring finger means 102 bearing on top of distributor plate 104, and resilient spring finger means 106 that engage the bottom surface of the distributor plate. This modification is similar to the Figure 4 arrangement in that it engages both the top and bottom surfaces of the distributor plate but exerts no radial pressure on the plate.

In Figure 12 there is shown a modification similar to what is disclosed in Figure 8 in that a spider element 108 is dropped around the central bushing of the distributor, with the spider element being provided with a spring finger means 110 to engage the underneath side of the distributor plate with resilient pressure, while a projecting portion 112 extends outwardly to between the spring anchor posts upstanding from the bottom wall of the distributor housing to hold the spider member against rotation in the distributor housing. It will be understood that the projection 112 could be eliminated, however, and the spider element permitted to rotate with the distributor plate by providing a smooth machined surface on the bottom wall of the distributor housing on which the spider would bear.

Inasmuch as any wobble of the distributor plate will take place, due to looseness of the engagement of the hub thereof with the central bushing of the distributor housing, my invention also proposes to hold the plate against such tilting and wobbling movements and simultaneously exerts a slight frictional drag thereon, if desired, by forming the hub 114 of the distributor plate structure, as illustrated in Figure 13, with a slot 116 and snapping around the hub 114 a spring clip 118 having a portion 120 that engages the central bushing 122 of the distributor housing.

The Figure 13 ararngement could be practiced by providing a single slot in the hub of the distributor plate structure, preferably about the center thereof, or could be practiced by providing slots adjacent the upper and lower ends of the hub, in which case two of the spring clips 118 would be employed.

As is illustrated in Figure 14, the distributor housing, indicated at 124 therein, could be provided with a smoothly machined annular surface 126 and a resilient finger means 128 engaging the said surface, with the said resilient finger means being attached to the distributor plate 130.

In connection with the Figure 14 arrangement, it will be evident, upon reference to Figure 2, that the resilient finger means could be formed on a ring element adapted for being mounted on the periphery of the distributor plate, with the said resilient finger elements engaging a suitably prepared area on the distributor housing.

In the Figure 15 modification a central bushing 132 of the distributor housing, or the hub 134 associated with the distributor plate, can be provided with a longitudinally extending slot 136 similar to a key-way, and with a formed metallic spring clip 138 being disposed therein which will exert resilient pressure between the hub and spaced points of the distributor plate structure, thereby resiliently to restrain the distributor plate against tilting movement.

In the various modifications of the invention which have been described it will be evident that there is the common feature of exerting resilient pressure between the distributor plate structure and a fixed portion of the housing in which it is movably mounted, thereby to restrain the plate to move in a single fixed plane with stabilized motion, whereby the most precise adjustments can be made of the breaker points carried by the distributor plate, and this adjustment will be exactly maintained.

It will be understood that this invention is susceptible to modification in order to adapt it to different usages and conditions and, accordingly, it is desired to comprehend such modifications within this invention as may fall within the scope of the appended claims.

I claim:

1. In combination with an ignition distributor having a housing and a distributor plate rotatably supported therein; a ring member supported in fixed position within said housing, and resilient spring finger means extending from said ring past the edge of said plate at points spaced circumferentially thereof, each said spring finger means having an indentation formed therein receiving the edge of said plate, and each said spring finger means bearing on said plate with resilient pressure.

2. In combination with an ignition distributor comprising a body part having a distributor plate rotatably supported therein and being open on one side; a distributor cap adapted for fitting on the open side of said body part for closing said housing, said body part and said cap part including interengageable portions for keying the cap part to the body part, a plurality of resilient spring fingers in pressure engagement with spaced points about the periphery of said plate, and a ring supporting said fingers and comprising a part fitting within the open end of said body part, and a part extending outwardly between said body part and cap part and including notch means for cooperation with said interengageable portions for locating and locking the said ring in position in said housing.

3. As a new article of manufacture; a ring member comprising a vertical flange portion adapted for fitting within the open end of a distributor housing, a horizontal flange portion extending from one end of the vertical flange portion for overlying the open end of the distributor housing, and resilient spring finger means spaced about the ring member and projecting inwardly and downwardly from the lower end of said vertical flange portion.

4. As a new article of manufacture; a ring member comprising a vertical flange portion adapted for fitting within the open end of a distributor housing, a horizontal flange portion extending from one end of the vertical flange portion for overlying the open end of the distributor housing, and resilient spring finger means spaced about the ring member and projecting inwardly and downwardly from the lower end of said vertical flange portion, each of said finger elements having its outer end formed to engage said plate in freely slidable relation.

5. In combination with an ignition distributor having a housing and a distributor plate rotatably mounted therein; a ring member supported in fixed position in the housing, and spring finger means extending from said ring into resilient pressure engagement with both the upper and lower surfaces of said plate in the region of the margin thereof to stabilize the plate within said housing.

References Cited in the file of this patent

UNITED STATES PATENTS

| | | |
|---|---|---|
| 1,688,005 | Dicksee | Oct. 16, 1928 |
| 2,075,904 | Lang et al. | Apr. 6, 1937 |
| 2,390,050 | Bales | Dec. 4, 1945 |
| 2,444,149 | Aldridge | June 29, 1948 |
| 2,489,775 | Haubert | Nov. 29, 1949 |
| 2,546,710 | Aldridge | Mar. 27, 1951 |
| 2,610,264 | Fitzsimmons | Sept. 9, 1952 |
| 2,641,660 | McKenna | June 9, 1953 |
| 2,643,304 | Lautzenhiser | June 23, 1953 |